W. H. BRASIER.
INSPIRATOR VALVE FOR INTAKE MANIFOLDS.
APPLICATION FILED FEB. 26, 1916.
1,240,303.
Patented Sept. 18, 1917.
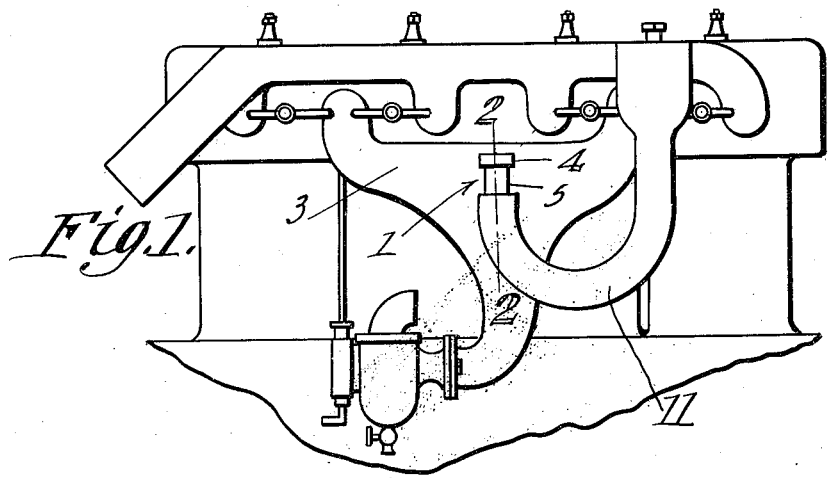
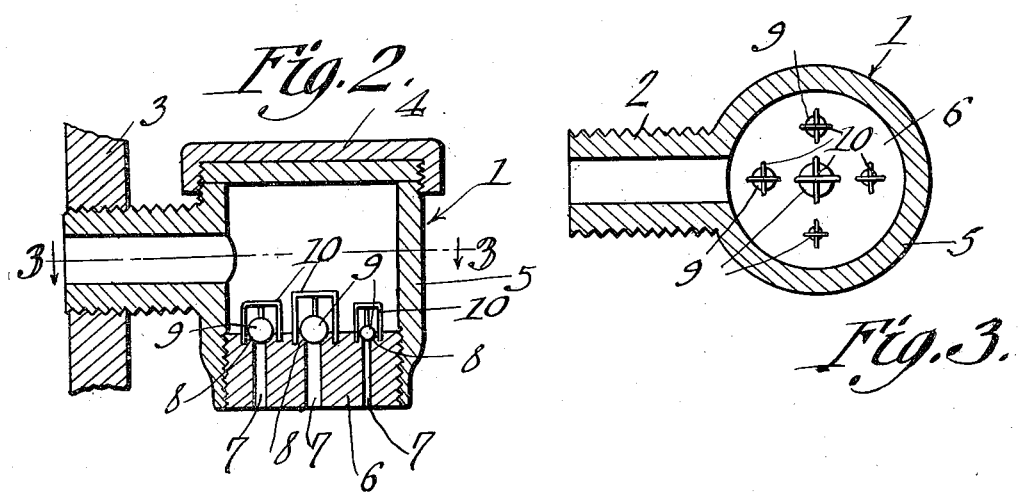
W. H. Brasier
Inventor

UNITED STATES PATENT OFFICE.

WILLIAM H. BRASIER, OF CORPUS CHRISTI, TEXAS.

INSPIRATOR-VALVE FOR INTAKE-MANIFOLDS.

1,240,303.  Specification of Letters Patent.  Patented Sept. 18, 1917.

Application filed February 26, 1916.  Serial No. 80,704.

*To all whom it may concern:*

Be it known that I, WILLIAM H. BRASIER, a citizen of the United States, residing at Corpus Christi, in the county of Nueces and State of Texas, have invented a new and useful Inspirator-Valve for Intake-Manifolds, of which the following is a specification.

The present invention appertains to air inlet valves for the intake manifolds, and aims to provide a novel and improved inspirator valve attachable to the intake manifold, whereby an accelerated supply of air is admitted into the intake manifold as the suction is increased.

It is also within the scope of the invention to provide an inspirator valve for the purpose indicated, which is simple and inexpensive in construction, as well as being efficient and practical in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a fragmental elevation of the inspirator valve applied to the intake manifold.

Fig. 2 is a vertical section of the valve taken on the line 2—2 of Fig. 1, this figure being on an enlarged scale.

Fig. 3 is a horizontal section of the valve taken on the line 3—3 of Fig. 2.

The inspirator valve is designated generally by the numeral 1, and embodies an upright T-shaped casing or coupling, the nipple or branch 2 of which is adapted to be threaded through one wall of the intake manifold 3. A screw cap 4 is threaded over the upper end of the casing 5, and a screw plug 6 is threaded into the lower end thereof. The plug 6 is provided with a plurality of ducts or bores 7 therethrough of graduated sizes or diameters, and the upper or inner ends of the ducts 7 terminate in concaved valve seats 8 of sizes proportional to the sizes or diameters of the ducts. The valve seats 8 are provided upon the upper or inner side of the plug 6, and balls 9 of graduated sizes are seatable in the respective seats 8 over the ducts 7. The balls 9 are held in place over the seats 8 by means of cages or arched spiders 10 which have their terminals engaging downwardly into the plug 6 and which stand over the valve seats, to guide the balls 9 for movement to and from the seats, and to prevent the balls from being displaced within the casing out of operative position.

In practice, the nipple or branch 2 of the casing is threaded through one wall of the intake manifold at the point desired, and a rubber hose or tubing 11 is preferably engaged at one end to the lower end of the casing 5, so that the rubber tubing 11 may be extended to a suitable point for receiving fresh or heated air therein. Now, when air is drawn or sucked through the intake manifold, the suction will extend into the casing 5, and will raise or unseat one or more of the balls 9 for admitting an auxiliary supply of air into the intake manifold. Particular attention is directed to the fact that the balls 9 are of different or graduated sizes, whereby the smallest ball 9 will be first unseated to admit a small supply of fresh air into the intake manifold, and as the suction increases, the balls 9 will be unseated or raised in succession from the smallest size up to the largest. In this manner, when the suction is weak, only the smallest ball 9 will be opened or raised, to admit only a small supply of air into the intake manifold, and as the suction increases, the successive balls 9 will be opened to admit an accelerated supply of air into the intake manifold through the valve 1. The smallest ball 9 will naturally be the lightest, and closes the smallest duct 7, whereby the smallest ball will first be raised, and since the several balls are of graduated sizes and weights, and close the graduated sizes of ducts, the balls will naturally unseat in regular order according to their sizes, and whereby the accelerated supply of fresh air into the intake manifold is accomplished.

The balls 9 are free to rotate in unseating and seating, whereby the wear between the balls and their seats will be uniform, to prevent leakage, and to assure of the proper operation of the valve at all times. It is apparent that the cap 4 may be removed without detaching the hose or tubing 11, for inspecting the interior of the valve whenever desired.

What is claimed is:

An inspirator valve comprising an upright T-shaped casing, a removable cap threaded on the upper end thereof, a plug threaded into the lower end of the casing and having a series of ducts therethrough of graduated sizes, the plug having concaved seats of graduated sizes at the upper ends of the respective ducts, balls of graduated sizes seatable in the respective seats and adapted to unseat in succession, and arched spiders having their terminals engaged downwardly into said plug above the valve seats to guide the respective balls for movement to and from the seats.

In testimony that I claim the foregoing as my own, I have hereto affixed my signature in the presence of two witnesses.

WILLIAM H. BRASIER.

Witnesses:
W. L. HAMMER,
JENNIE BENGE.